United States Patent [19]

Adam et al.

[11] 4,183,495

[45] Jan. 15, 1980

[54] BASE SUPPORT MOUNT FOR HEAT PUMPS AND LIKE MACHINERY

[76] Inventors: Brian D. Adam; Douglas G. Adam, both of P.O. Box 1434, Sioux City, Iowa 51102

[21] Appl. No.: 917,103

[22] Filed: Jun. 19, 1978

[51] Int. Cl.² .......................................... F16M 13/00
[52] U.S. Cl. ................... 248/558; 248/188.8
[58] Field of Search .................. 248/159, 188.1, 188.2, 248/188.8, 359.1, 558, 673, 677, 678, 679

[56] References Cited

U.S. PATENT DOCUMENTS

| | | | |
|---|---|---|---|
| 543,047 | 7/1895 | Nasahl | 248/159 |
| 1,320,823 | 11/1919 | Astruck | 248/159 |
| 1,575,235 | 3/1926 | Tiffany | 248/673 |
| 1,655,611 | 1/1928 | Jensen | 248/677 X |
| 2,053,517 | 8/1936 | Crandall et al. | 248/359.1 |
| 2,468,856 | 5/1949 | Alexander | 248/188.2 X |
| 2,893,164 | 7/1959 | Martin | 248/188.2 |
| 3,598,351 | 8/1971 | Schreyer | 248/188.8 X |
| 3,788,581 | 1/1974 | Rutzick | 248/678 |
| 4,073,454 | 2/1978 | Sauber | 248/188.8 X |

Primary Examiner—William H. Schultz
Attorney, Agent, or Firm—Shlesinger, Arkwright, Garvey & Dinsmore

[57] ABSTRACT

The base support mount for heat pumps and the like machinery is comprised of a top cap portion which contains a depressed area for accepting a protrusion from the bottom of a machine, a hollow central column portion and a ribbed base portion. The top cap, central column and ribbed base portions are separable and thereby permit the central column to be manufactured in various lengths and further allows the different length columns to be interchangeable with the top cap and ribbed base portions. This interchangeability permits the base support mount of the present invention to be easily manufactured in differing heights for supporting heat pumps and the like machinery.

11 Claims, 8 Drawing Figures ature is different for various geographical conditions as different climatic conditions surrounding the heat pump will affect the amount and rate of ice build-up. The presence of heat pumps in extremely differing climatic regions then, presents the need for a mechanism for supporting heat pumps at varying heights. The large expenditure of time and money would make the manufacture of separate, distinct support mounts for different geographical locations economically unfeasible. However, a support mount which could be inexpensively manufactured and be readily adapted for differing heights would fulfill this need for a variable-height heat pump support mount.

BASE SUPPORT MOUNT FOR HEAT PUMPS AND LIKE MACHINERY

BACKGROUND AND FIELD OF THE INVENTION

The present invention relates to a base support mount for heat pumps and the like machinery.

Heat pumps and other similar machinery have conventionally been supported by support mounts which are manufactured with or manufactured specifically for a particular apparatus. These types of support mounts then, will only support the apparatus at one particular height and will not allow for rather large height adjustments without significant alteration of the support mount.

Prior art supports for heat pumps and similar machinery are typified by the support disclosed by Pettersson in U.S. Pat. No. 3,687,192. Other prior art supports which have been utilized include those disclosed by Galloway in U.S. Pat No. 3,311,333 and by Nasahl in U.S. Pat. No 543,047.

However, a support mount for a heat pump apparatus would most advantageously be adapted for variable height adjustments. Due to periodic ice build-up on the parts of the apparatus surrounding the heat transfer coils, a heat pump must intermittently be defrosted in order to prevent possible damage to the coils. During this defrosting operation, the heat pump must be elevated by means of support mounts to allow for proper drainage of the water draining from the frosted area. This necessary elevation however, is different for various geographical locations as different climatic conditions surrounding the heat pump will affect the amount and rate of ice build-up. The presence of heat pumps in extremely differing climatic regions then, presents the need for a mechanism for supporting heat pumps at varying heights. The large expenditure of time and money would make the manufacture of separate, distinct support mounts for different geographical locations economically unfeasible. However, a support mount which could be inexpensively manufactured and be readily adapted for differing heights would fulfill this need for a variable-height heat pump support mount.

OBJECTS AND SUMMARY

It is therefore one object of the present invention to provide a base support mount for heat pumps and the like machinery which can be easily and inexpensively manufactured or constructed in varying heights.

It is a further object of the present invention to provide a base support mount for heat pumps and the like machinery which has an increased utility by being height variable but still utilizes those portions of the support mount which are maintained at a constant size and not varied as the height of the support mount is changed.

It is a further object of the present invention to provide a base support mount for heat pumps and the like machinery which provides a dependable and sturdy support.

It is another object of the present invention to provide a base support mount for heat pumps and the like machinery which provides the support necessary for proper drainage during defrosting of heat pumps.

Yet another object of the present invention is to provide a base support mount for heat pumps and the like machinery which is compatible in design and appearance with a heat pump apparatus.

A further object of the present invention is to provide a base support mount for heat pumps and the like machinery which will support a substantial load and distribute the weight evenly on the support members with minimum structural detail.

A still further object of the present invention is to provide a base support mount for heat pumps and the like machinery which can be placed on a column inserted in a base or base cylinder.

These and further objects of the present invention are accomplished by providing a base support mount for heat pumps and the like machinery which is comprised of a top cap portion which contains a depressed area for accepting a protrusion from the bottom of the apparatus, a hollow central column portion and a ribbed base portion. The top cap, central column and ribbed base portions are separable and thereby permit the central column to be manufactured in various lengths and further allow the differing length columns to be interchangeable with the top cap and ribbed base portions. This interchangeability permits the base support mount of the present invention to be easily manufactured in differing heights for supporting heat pumps and the like machinery.

DETAILED DESCRIPTION

Referring now to the figures in which.

Figure 1:
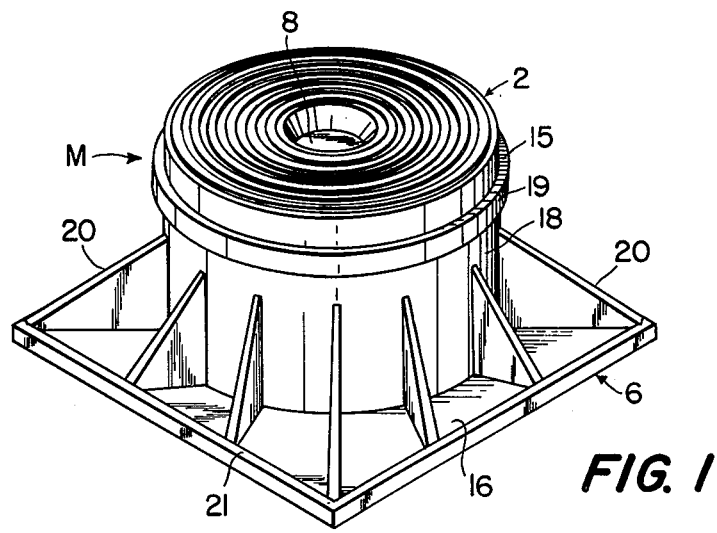
FIG. 1 is a perspective view of the base support mount.
Figure 2:
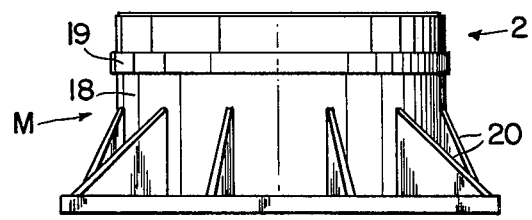
FIG. 2 is a side elevational view thereof.
Figure 5:
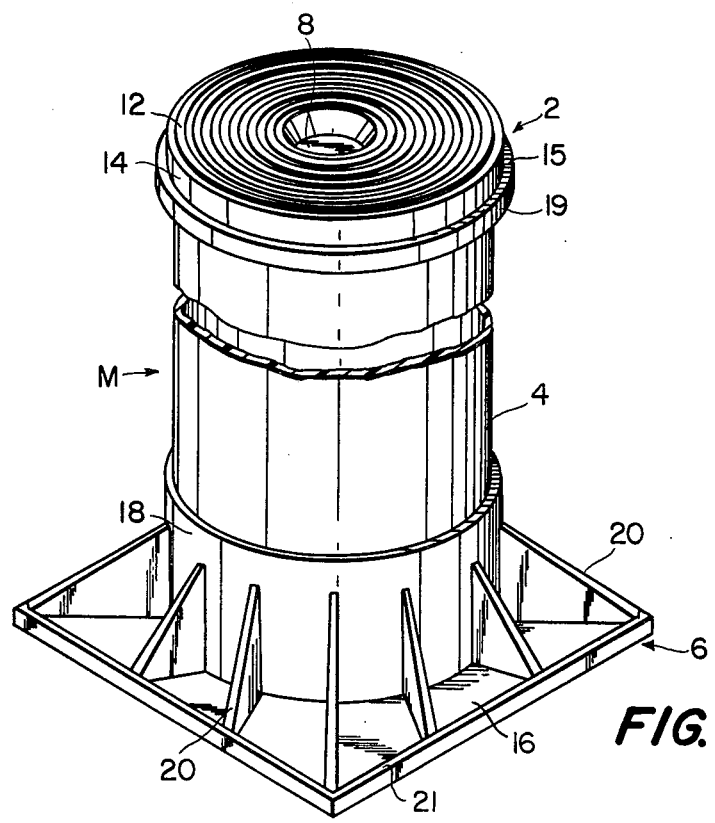
FIG. 5 is a perspective view of a modified form of the base support mount of FIG. 1.
Figure 6:
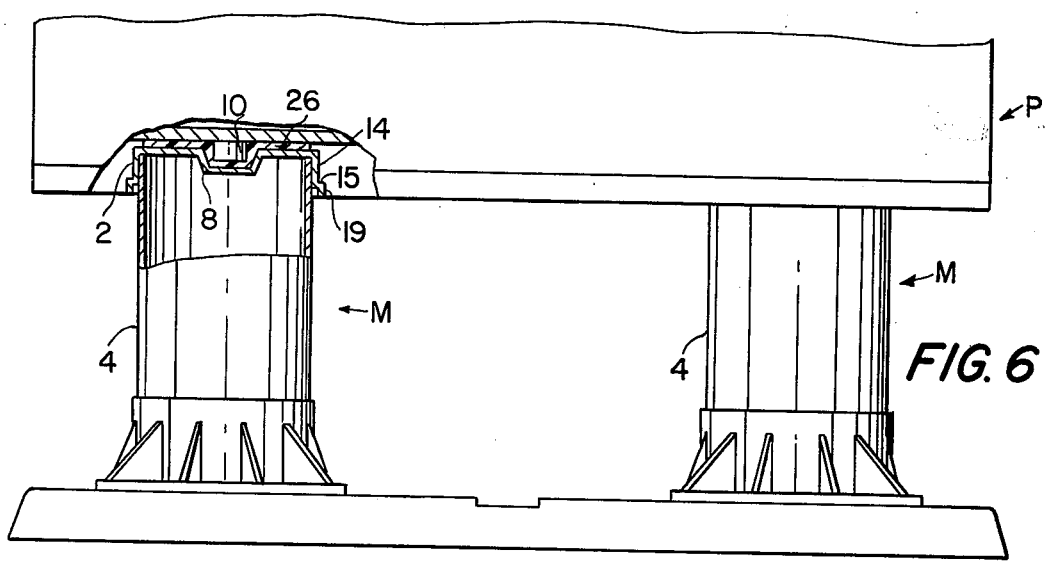
FIG. 6 is a side elevational view of the base support mounts attached to a heat pump apparatus with a portion broken away to expose the top of a base support mount and the base mounted thereon.

The base support mount M of the present invention, as shown in FIG. 5, is generally comprised of a top cap 2, central hollow column 4 and a ribbed base support 6. It is obvious that column 4 may be a solid column. The top cap 2 is provided with a circular depressed area 8 for accepting a bolt shaped protrusion 10 from the bottom of a heat pump P as shown in FIG. 6, and circular concentric grooves 12 on the top surface of top cap 2 forming a series of raised rings, all of equal height and having their top surfaces in the same plane, which prevent slippage of the supported apparatus. The top cap side 14 is constructed to allow the top cap 2 to tightly fit over and around the central column or cylinder 4 to provide a support mount of indeterminate height, as shown in FIGS. 5 and 6. Alternatively, the top cap 2 may fit over the ribbed base 6 to provide a base support mount of the shortest length available using the present invention, as shown in FIGS. 1 and 2. In this form, the top cap 2 is placed on the top edge of the short hollow cylinder 18 of the ribbed base support 6, having a rectangular bottom member 16, and with the flange skirt 19 fitting around the cylinder 18. The top cap 2 is manufactured such that the internal diameter of the flange 15 approximates the outside diameter of the short cylinder 18 while the internal diameter of the top cap side 14 approximates the outside diameter of the column 4; thereby ensuring a secure fit of top cap 2 onto either short cylinder 18 or column 4.

The central column 4 is a hollow plastic pipe which can be manufactured in any length to provide the proper height needed for a pump located in any climatic condition. The central column 4 is of a constant diameter and, as such, will tightly fit into the short cylinder 18 of the ribbed base 6 in a manner similar to the tight fit of the top cap 2 over the central column 4.

Figure 3:
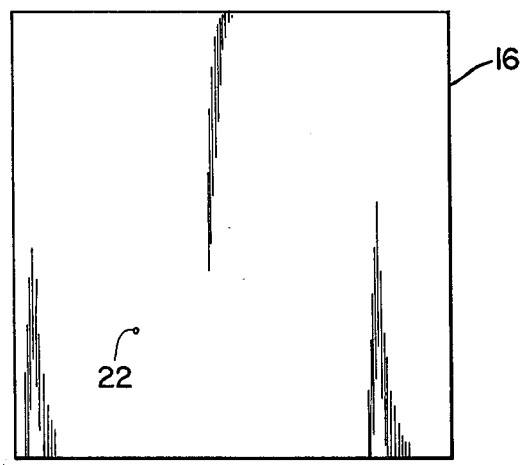
FIG. 3 is a bottom plan view thereof.
Figure 4:
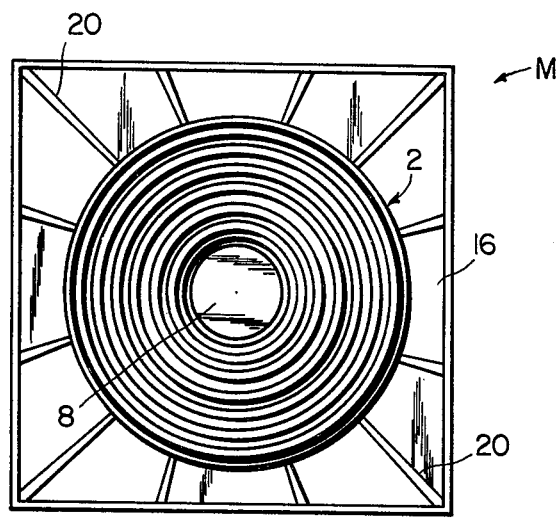
FIG. 4 is a top plan view thereof.

The ribbed base support 6 of the present invention is a rectangular bottom member 16 attached to a short hollow cylinder 18 with triangularly shaped ribs 20 extending from the outer surface of the cylinder 18 to the rectangular bottom member 16, as shown in FIG. 5. By being placed tightly between the short cylinder 18 and the raised lip area 21 of the rectangular bottom member 16, the triangular ribs 20 prevent the lateral shifting of the cylinder 18 of the base support mount M and thereby provide the strength necessary to support a heavy apparatus and yet allow the base support mount M to be made of hollow and lightweight plastic. One important limitation on the construction of the ribs 20, is that the ribs 20 necessarily extend only partially the height of the cylinder 18 so as to enable the attachment of a top cap 2 without inhibiting the secure fit of flange skirt 19 around cylinder 18. The ribbed base support 6 is most advantageously manufactured having twelve of the ribs 20 with two ribs extending to each of the four sides of bottom member 16 and one rib extending to each of the four corners of bottom member 16. There is additionally provided a drain hole 22 in the rectangular bottom member 16, as shown in FIG. 3, to allow for drainage of any water which may enter the hollow base support mount M.

Figure 7:
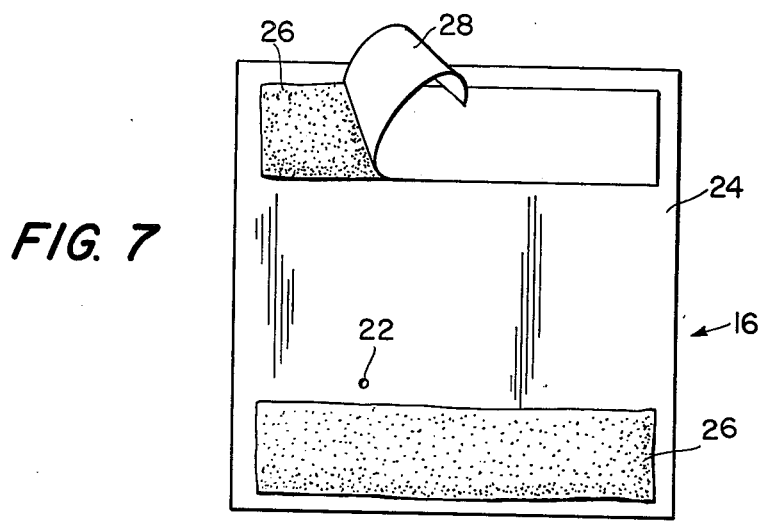
FIG. 7 is a bottom plan view of a modified form of the base support mount of FIG. 1.
Figure 8:
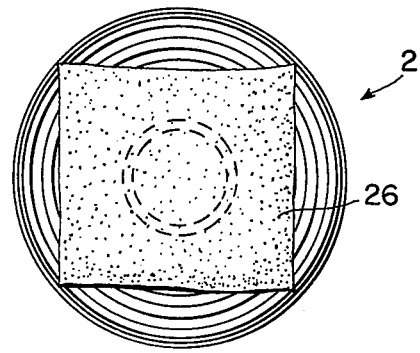
FIG. 8 is a top plan view of a modified form of the base support mount of FIG. 1.

As shown in FIGS. 6, 7 and 8, both the bottom surface 24 of the rectangular bottom member 16 and the outer top surface of the top cap 2 may be provided with a butyl mastic or other pressure sensitive adhesive material 26, in strips or patches, which is exposed after removal of a pressure release strip 28 and secures the supporting of the heat pump P by preventing slippage of a heat pump on the base support mount or slippage of the support mount on a floor or other horizontal surface.

In its use, as shown in FIG. 6, the support mount M of the present invention is placed on a horizontal surface with the protrusion 10 of the heat pump P pressing into the circular depressed area 8 and being completely surrounded by the adhesive material 26 so as to securely retain the protrusion 10 in the depressed area 8. Generally, each heat pump P would be supported by four support mounts M with one support mount M at each corner being secured by a protrusion bolt 10.

While this invention has been described as having a preferred design, it will be understood that it is capable of further modification. This application, is, therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

We claim:

1. A base support mount for a machine and the like comprising:
   (a) a top cap, central column and ribbed base;
   (b) said top cap having means for supporting said machine and having a top surface and a side surface;
   (c) said central column being separable from said top cap and ribbed base;
   (d) said ribbed base having means for supporting said central column including ribs, a bottom member and an upstanding cylinder with said ribs extending from said cylinder and connected to said bottom member; and
   (e) anti-skid means on said top cap for preventing said machine from shifting.

2. A base support mount for a machine and the like as in claim 1 and wherein:
   (a) said supporting means is a circular depression in said top surface of said top cap for accepting a bolt-shaped or the like protrusion from the bottom of said machine.

3. A base support mount for a machine and the like as in claim 1 and wherein:
   (a) said top cap is in a cap fit arrangement on said central column with said side surface of said top cap fitting over and around said central column and with said central column being supported in said upstanding cylinder of said ribbed base.

4. A base support mount for a machine and the like as in claim 1 and wherein:
   (a) said top cap is in a cap fit arrangement on said upstanding cylinder of said ribbed base.

5. A base support mount for a machine and the like as in claim 1 and wherein:
   (a) said anti-skid means on said top cap comprises a series of concentric circular grooves.

6. A base support mount for a machine and the like as in claim 1 and wherein:
   (a) said anti-skid means on said top cap comprises an adhesive material.

7. A base support mount for a machine and the like as in claim 2 and wherein:
   (a) said top surface of said top cap having attached thereto an adhesive material covering said circular depression for adhesion to said bolt shaped on the like protrusion.

8. A base support mount for a machine and the like as in claim 1 and wherein:
   (a) said ribbed base having a drainage means wherein said drainage means is a hole penetrating through said bottom member and communicating with said upstanding cylinder.

9. A base support mount for a machine and the like as in claim 1 and wherein:
   (a) said bottom member of said ribbed base has attached thereto an adhesive material for preventing said support mount from shifting on a horizontal surface.

10. A base support mount for a machine and the like as in claim 1 and wherein:
    (a) said bottom member is rectangular having four sides, four corners and an upwardly extending raised lip on each of said four sides and having attached thereto twelve of said ribs with two of said ribs projecting to each of said four sides and one of said ribs projecting to each of said four corners with all of said ribs extending from said central column to said raised lip.

11. A base support mount for a machine and the like as in claim 1 and wherein:
    (a) said top cap, central column and upstanding cylinder are hollow.

* * * * *